United States Patent
Bushre

(10) Patent No.: US 8,733,992 B2
(45) Date of Patent: May 27, 2014

(54) LED LOW PROFILE LINEAR FRONT FOG MODULE

(71) Applicant: OSRAM SYLVANIA Inc., Danvers, MA (US)

(72) Inventor: Adam L. Bushre, Saranac, MI (US)

(73) Assignee: OSRAM SYLVANIA, Inc., Danvers, MA (US)

( * ) Notice: Subject to any disclaimer, the term of this patent is extended or adjusted under 35 U.S.C. 154(b) by 0 days.

(21) Appl. No.: 13/632,201

(22) Filed: Oct. 1, 2012

(65) Prior Publication Data

US 2014/0092619 A1    Apr. 3, 2014

(51) Int. Cl.
*F21V 5/00* (2006.01)
(52) U.S. Cl.
USPC ............ 362/520; 362/487; 362/507; 362/509
(58) Field of Classification Search
USPC ................................................ 362/507, 520
See application file for complete search history.

(56) References Cited

U.S. PATENT DOCUMENTS

| | | |
|---|---|---|
| 5,404,869 A | 4/1995 | Parkyn, Jr. et al. |
| 7,686,486 B2 | 3/2010 | Tessnow et al. |
| 8,011,803 B2 | 9/2011 | Cheung et al. |
| 2008/0043466 A1 | 2/2008 | Chakmakjian et al. |
| 2009/0059333 A1* | 3/2009 | Sakai .......................... 359/197 |
| 2012/0188786 A1* | 7/2012 | Burges ......................... 362/551 |

\* cited by examiner

*Primary Examiner* — Donald Raleigh
(74) *Attorney, Agent, or Firm* — Edward S. Podszus

(57) ABSTRACT

A fog lamp for a vehicle is disclosed. Light leaving an LED is collected by a refractive/TIR lens. The central portion of the refractive/TIR lens is purely refractive, while the peripheral portion of the lens includes a total internal reflection off an exterior surface of the lens. The refractive/TIR lens converges the light to a focus at or near a laterally-elongated aperture in a light baffle. Light exiting the aperture diverges and passes through an anamorphic lens, which reduces the angular extent of the beam in the vertical direction and increases the angular extent in the lateral direction. The full fog lamp may include multiple pairs of LEDs and respective refractive/TIR lenses, all arranged coplanar, parallel and laterally adjacent to each other. The LED/lens pairs may all direct light through a single light baffle and through a single anamorphic lens.

16 Claims, 10 Drawing Sheets

US 8,733,992 B2

LED LOW PROFILE LINEAR FRONT FOG MODULE

TECHNICAL FIELD

The present disclosure relates to fog lamps for automotive lighting systems.

BACKGROUND

For many years, automobiles have employed electric lighting that serves a variety of functions. For instance, lights provide forward illumination (headlamps, auxiliary lamps), conspicuity (parking lights in front, taillights in rear), signaling (turn signals, hazards, brake lights, reversing lights), and convenience (dome lights, dashboard lighting), to name only a few applications. In recent years, light emitting diodes (LEDs) have become common in some of the lighting applications for automobiles. Compared with older incandescent bulbs, LEDs use less power, last longer, and have less heat output, making them well suited for automotive applications.

There is an ongoing effort to incorporate LEDs into fog lamps, as well as an ongoing effort to reduce the cost of manufacturing and simplify the assembly of fog lamps.

Some known lenses that incorporate total internal reflection (TIR) and some known fog lamps are disclosed in U.S. Pat. No. 8,011,803 (Cheung et al.), U.S. Patent Application Publication No. 2008/0043466 (Chakmakjian et al.), U.S. Pat. No. 5,404,869 (Parkyn, Jr. et al.) and U.S. Pat. No. 7,686,486 (Tessnow et al.).

SUMMARY

An embodiment is a fog lamp emitting light in a generally forward direction. The fog lamp includes a light emitting diode (LED) having an optical axis generally parallel to the forward direction. The fog lamp also includes a refractive/TIR lens receiving light directly from the LED and producing converging light. The converging light converges to a focus along the optical axis. The fog lamp also includes a light baffle disposed proximate the focus. The light baffle has an aperture centered on the optical axis and elongated along a lateral direction. The converging light that passes through the aperture forms diverging light. The fog lamp also includes an anamorphic lens having more optical power along a vertical direction than along the lateral direction. The diverging light that passes through the anamorphic lens forms an emergent beam. The emergent beam has a wider divergence along the lateral direction than along the vertical direction.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION OF PREFERRED EMBODIMENTS INCLUDING BEST MODE

Figure 1:
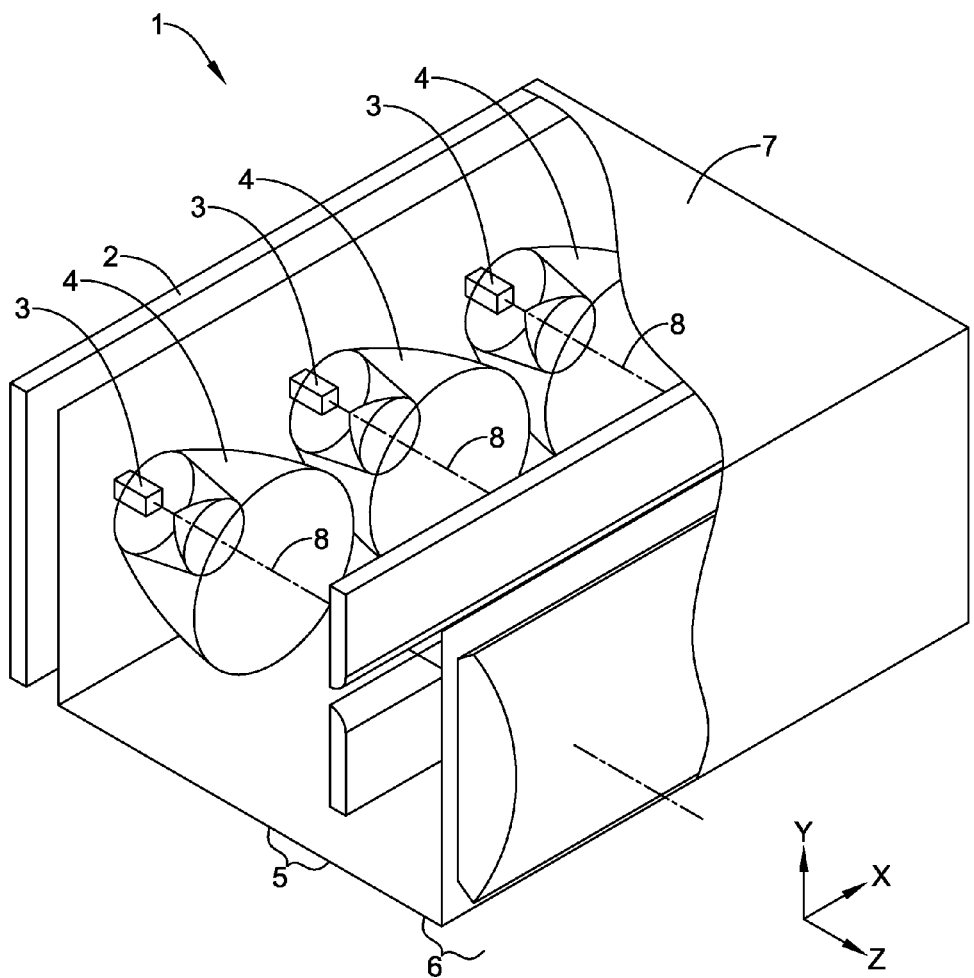
FIG. 1 is a cutaway-view drawing of an exemplary fog lamp.

Because fog lamps are mounted on the front of a vehicle during use and emit light in a distribution in front of the vehicle, it is beneficial to establish a convention for describing the various orientations and directions encountered in this document. Note that the term "vertical" may be relatively clear in referring to the direction perpendicular to the ground, or "up". However, the term "horizontal" may be ambiguous, in that it may describe any direction in a plane parallel to the ground. Instead of "horizontal", we will use the unambiguous terms "lateral" to denote the "left"-to-"right" direction, which is parallel to the front edge of the vehicle and parallel to the ground, and "forward" to denote the direction directly in front of the vehicle and parallel to the ground. In the drawings, the directions of lateral, vertical and forward are denoted by the shorthand labels of X, Y and Z. Note that the term "horizon" may be used to denote a plane parallel to the ground, including the Z-axis, and bisected by the Z-axis. In general, light propagating angularly below the horizon eventually hits the ground, where light propagating angularly above the horizon may strike the eyes of oncoming drivers. It is understood that the terms lateral, vertical and forward describe orientations and directions strictly when the device is in use, but may also be used for convenience to describe the relative orientations of elements with respect to each other even when the device is uninstalled, is inactive on a shelf or is in shipment.

Similarly, the term "generally" is used in this document to denote a typical direction, or a direction that is a combination of an intended direction with a slight misalignment caused by typical manufacturing, alignment or assembly tolerances. For instance, a fog lamp mounted on the front of a vehicle emits light toward the front of the vehicle, so it is said to emit light in a "generally" forward direction, even though its output may have an angular spread. Likewise, its output may be tilted slightly downward or slightly toward the shoulder to avoid blinding oncoming traffic. All of these cases qualify as "generally" forward.

A fog lamp for a vehicle is disclosed. Light leaving an LED is collected by a refractive/TIR lens. The central portion of the refractive/TIR lens is purely refractive, while the peripheral portion of the lens includes a total internal reflection off an exterior surface of the lens. The refractive/TIR lens converges the light to a focus at or near a laterally-elongated aperture in a light baffle. Light exiting the aperture diverges and passes through an anamorphic lens, which reduces the angular extent of the beam in the vertical direction and increases the angular extent in the lateral direction. The full fog lamp may include multiple pairs of LEDs and respective refractive/TIR lenses, all arranged coplanar, parallel and laterally adjacent to each other. The LED/lens pairs may all direct light through a single light baffle and through a single anamorphic lens.

The above paragraph is merely a generalization of several of the elements and features described in detail below, and should not be construed as limiting in any way. Next, we provide a discussion of the optical path in the fog lamp, followed by a more detailed discussion of several of the optical elements in the fog lamp.

Figure 2:
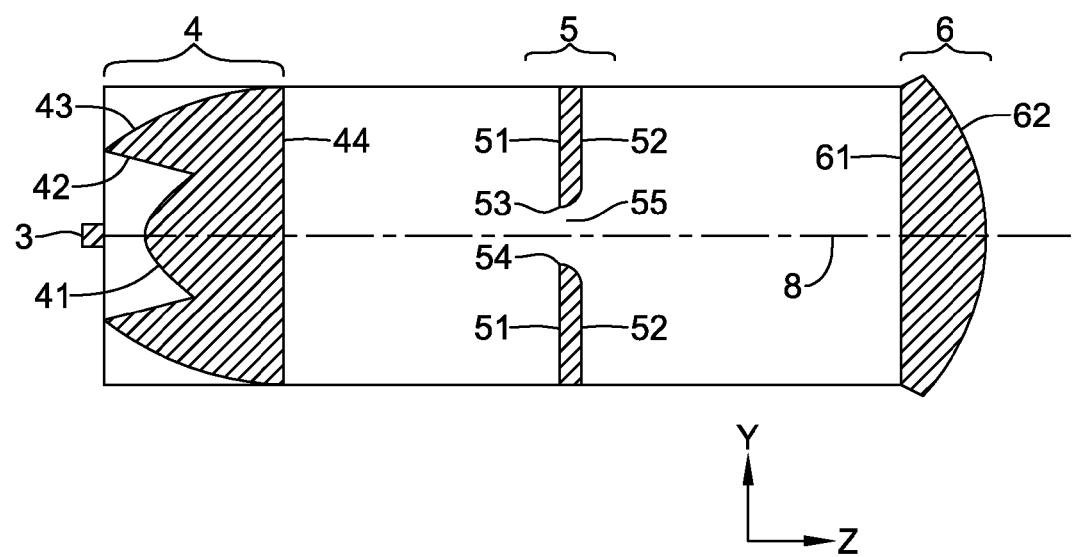
FIG. 2 is a vertical cross-sectional side-view drawing of the optics inside the fog lamp of FIG. 1.
Figure 3:
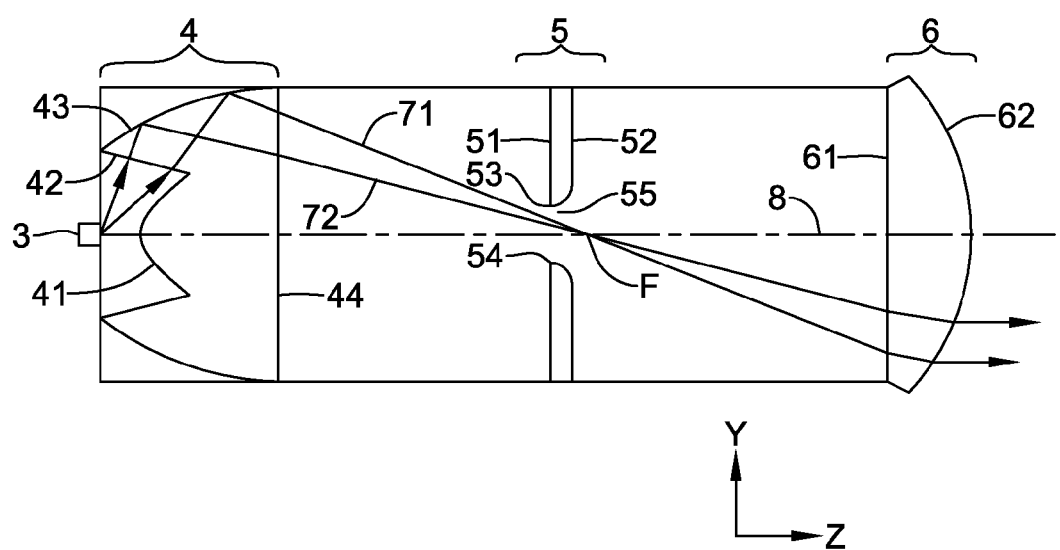
FIG. 3 is a schematic drawing in side-view of rays passing through the TIR portion of a refractive/TIR lens in the fog lamp of FIG. 1.
Figure 4:
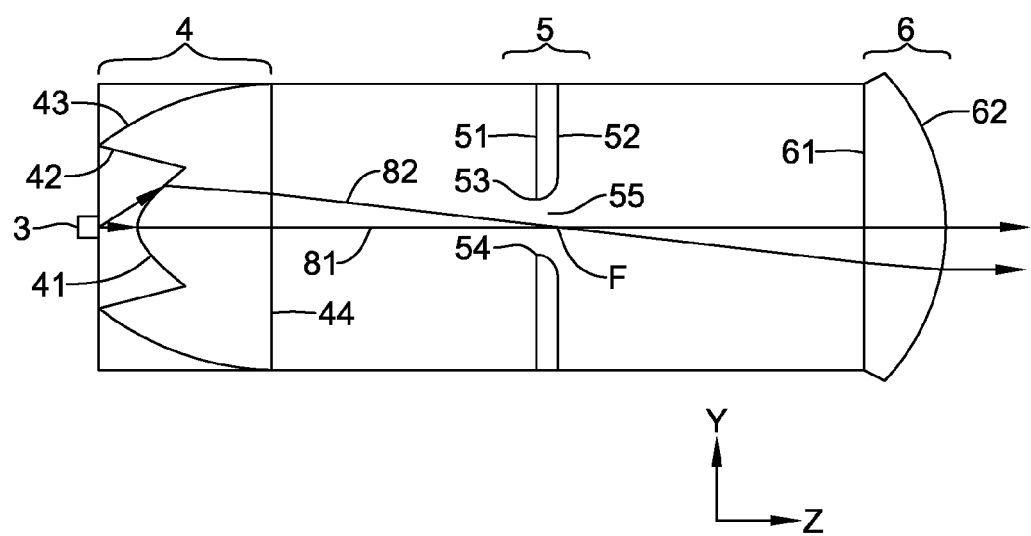
FIG. 4 is a schematic drawing in side-view of rays passing through the refractive portion of a refractive/TIR lens in the fog lamp of FIG. 1.
Figure 5:
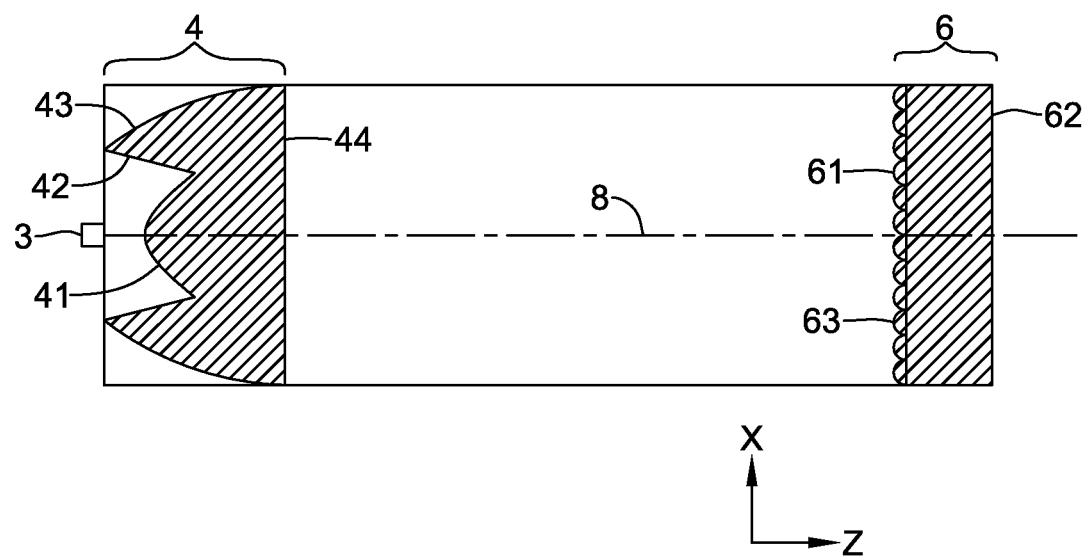
FIG. 5 is a horizontal cross-sectional top-view drawing of the optics inside the fog lamp of FIG. 1.
Figure 6:
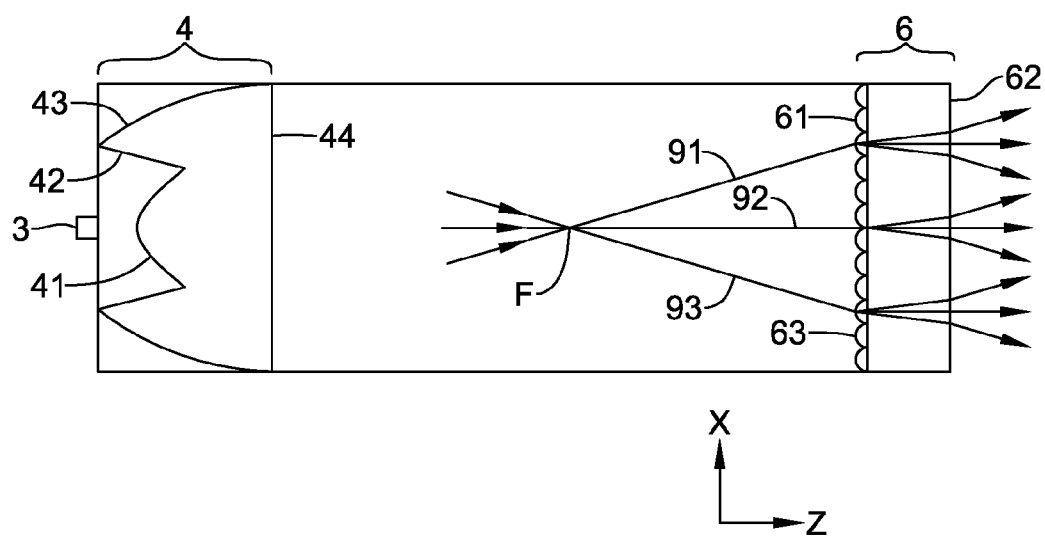
FIG. 6 is a schematic drawing of rays in top-view passing through the anamorphic lens in the fog lamp of FIG. 1.

FIG. 1 is a cutaway-view drawing of an example fog lamp 1. FIG. 2 shows the fog lamp 1 in vertical cross-section in a side view, with FIGS. 3 and 4 showing example light rays traced through the optical elements of the vertical cross-section in side view. FIG. 5 shows the fog lamp 1 in horizontal cross-section in a top view, with FIG. 6 showing example light rays partially traced though the optical elements of the horizontal cross-section in top view. Note that FIG. 6 omits the light baffle, and is intended only to demonstrate the paths of rays after they have been brought to focus and pass through the anamorphic lens. We describe the optical path and the associated elements from left-to-right in the figures.

At the leftmost edge of the fog lamp 1 in FIG. 1 is a generally planar circuit board 2 that mechanically supports, electrically controls and thermally regulates a plurality of LEDs 3.

The circuitry on the circuit board 2 for controlling each LED 3 in the plurality is generally well-known to one of ordinary skill in the art, and may be purchased commercially through any suitable electronics manufacturing service supplier. The circuit board 2 may be fitted with suitable connectors or wires for powering the LEDs 3. The circuit board 2 may also use a carrier to mechanically attach it to the housing of the fog lamp 1.

When installed in a vehicle, the plane of the circuit board 2 is generally vertical, and perpendicular to the forward direction. In this orientation, the circuit board 2 has a lateral dimension larger than its vertical dimension. In general, the mechanical space allocated for the fog lamp 1 is quite limited, so the components and the optical train of the fog lamp 1 are often made as small as possible. The footprint of the circuit board 2, meaning the maximum lateral and vertical dimensions, typically coincides with the footprint of the entire fog lamp 1.

In the example of FIG. 1, the circuit board 2 supports three LEDs 3; it will be understood that other numbers of LEDs 3 may be used as well, including one, two, four, five, six, seven, eight, nine, ten, eleven, twelve, thirteen, fourteen, fifteen, sixteen, or more than sixteen. The LEDs 3 are spaced apart laterally, and are typically equally spaced.

The LEDs 3 themselves typically include square emission surfaces, which are oriented vertically and have surface normals that are parallel to the forward direction. Each LED 3 emits power in a generally Lambertian distribution, with a maximum flux per steradian emitted along the surface normal, and the flux per steradian falling to zero at orientations parallel to the emission surface. Note that the quantity of flux per steradian, or equivalently, power per solid angle, describes the directional behavior of the light output.

The LEDs 3 typically have a color that is white or yellow. Note that most fog lamps that use yellow light do so for strictly historical reasons. For example, yellow light is likely intended to signal other drivers that the fog lights are being used; such a signaling would be impossible if the fog lights instead used white light. Note that in terms of optical effectiveness, there is no improvement in performance gained by using yellow light rather than white light.

The fog lamp 1 may use any suitable commercially available LED 3, such as a unit with part number LWG6CP, available from Osram Sylvania Inc of Danvers, Mass. This commercially available part is described by its manufacturer as "Advanced Power TOPLED with Chip Level Conversion (CLC), Enhanced optical Power LED (ThinGaN), white (W), white P-LCC-2 package, clear silicone resin, Lead (Pb) free, RoHS compliant." It will be understood that this is merely an example, and that any other suitable LED 3 may be used as well.

Each LED 3 radiates directly into a corresponding refractive/TIR lens 4. In other words, light leaves the LED 3 and arrives at the refractive/TIR lens 4 without interacting with any other elements. This is easily achieved in practice by placing the refractive/TIR lens 4 in close proximity or in contact with the respective LED 3.

The refractive/TIR lens 4 receives light directly from the LED 3 and brings it to a focus F at a predetermined distance away from the lens 4, typically at a predetermined location along the optical axis 8. The refractive/TIR lens 4 may have several advantages over typical all-refractive lenses. For instance, because the refractive/TIR lens 4 uses reflection, which is immune to chromatic aberrations (such as a variation in power or focal length with wavelength), the refractive/TIR lens 4 may have better performance with respect to color. More specifically, for some designs, the refractive/TIR lens 4 may show fewer color artifacts (such as red or blue coloration) at the edges of the light distribution than a comparable all-refractive lens. Another advantage may be that the refractive/TIR lens 4 may have a smaller size than an all-refractive lens with a comparable focal length. More specifically, the outer diameter and/or the thickness of the lens may be reduced by using the refractive/TIR lens 4.

The refractive/TIR lens 4 has four surfaces 41, 42, 43 and 44 that affect its optical performance. For the particular design in FIGS. 1-6, exiting surface 44, which faces away from the LED 3 and toward the viewer, is chosen to be planar or generally planar to within reasonable manufacturing tolerances. As such, the performance of the refractive/TIR lens 4 is determined by the shapes and sizes of the three remaining surfaces 41, 42 and 43. We discuss the function of each of these surfaces below.

A light ray leaving the LED 3 is incident on the lens 4, and strikes the lens 4 at either surface 41 or surface 42, depending on the location and direction of the particular light ray. Since surfaces 41 and 42 together receive all the incident light, the two surfaces taken together may be referred to as an "incident surface" of the lens 4. Here, the lens 4 has a seam or discontinuity that divides the incident surface into a central region 41 that surrounds the optical axis and a peripheral region 42 that surrounds the central region 41.

For light rays 81, 82 that strike the central region 41, the central region 41 acts like the incident surface in a typical, all-refractive, plano-convex lens. The central region 41 may have a base radius of curvature, which may be selected in the design phase of the lens in order to give a particular focal length to the lens 4. Optionally, the surface of the central region 41 may also have a conic constant and/or aspheric terms in its prescription, which would impart an aspheric surface profile to the central region 41, and may help correct for wavefront aberrations.

Note that light 81, 82 entering the lens 4 through the central region 41 and leaving through the exiting surface 44 undergoes two refractions, one at each surface, and no reflections. This accounts for the "refractive" portion of the refractive/TIR lens 4.

The "TIR" portion of the refractive/TIR lens 4 pertains to light rays 71, 72 that strike the peripheral region 42 of the incident surface of the lens 4. These rays 71, 72 undergo a refraction at the peripheral region 42 upon entering the lens 4, then a total internal reflection off the outer surface 43 of the lens 4, and then a refraction at the exiting surface 44 upon leaving the lens 4. Because the exiting surface 44 in the particular design of FIGS. 1-6, is flat, the properties of the exiting beam are largely determined by the size and shape of surfaces 42 and 43.

In some cases, it is desirable that the focus of the "TIR" portion coincide with that of the "refractive" portion. For these cases, the two foci are chosen to be at the same location along the optical axis. Note that under the strict definitions of focal length, the "TIR" and "refractive" portions may have slightly different focal lengths, which correspond to differently-located principal planes from the "TIR" and "refractive" portions, but may have coincident foci. Note that there may be aberrations that blur the focus laterally or longitudinally; it is understood for these aberrated cases that the term "coincident" also includes these aberrated cases. In addition, there are typical manufacturing and alignment tolerances that may blur or displace one or both foci; these are also covered by the term "coincident".

It is beneficial to briefly discuss chromatic aberration and its pertinence to the fog lamp 1. Chromatic aberration may be thought of as a slight change in focal length or focal distance, as a function of wavelength. For instance, red light may come to a particular focus, while blue light may come to a second focus slightly displaced away from the red focus. In practical terms for a fog lamp 1, the presence of chromatic aberration may lead to a slight blue or red tint at the angular edges of the light distribution, or a slight change in tint as the vehicle drives by.

Chromatic aberration arises because optical glass or plastic materials have a refractive index that inherently changes with wavelength. For white-light systems, which have a relatively broad spectrum, the refractive index at the short wavelengths is generally higher than at the long wavelengths. A typical positive, purely refractive lens made from a single material typically shows a particular non-zero amount of chromatic aberration, caused by this variation in refractive index with wavelength. The typical way of correcting for chromatic aberration is to form the lens from two different materials, each having a different variation of refractive index with wavelength. An interesting way of adjusting the amount of chromatic aberration, and potentially reducing it to zero, is discussed presently. Note that this chromatic correction is obtained for a single lens made from a single material, which is generally difficult or impossible to do.

The chromatic aberration in the "TIR" portion is determined only by the shape of the peripheral region 42. The reflection off the outer surface 43 does not contribute any chromatic aberration, because reflections from standard surfaces do not produce any chromatic aberration. The refraction through the exiting surface 44 does not contribute any chromatic aberration, because the exiting surface 44 is flat. As such, if one wants to explicitly deal with chromatic aberration in the design, there are several options available.

As a first choice, the chromatic aberration of the "TIR" portion may be set to zero. This may be done by choosing a surface 42 to have normally incident light rays from the LED 3 as they strike the surface 42. Such a surface will be concave, and will be generally concentric around the center of the LED 3. Once the shape of the surface 42 is determined, the shape of outer surface 43 may be adjusted to focus the emergent light to the desired location on the optical axis.

Note that this normally-incident condition is effectively a null for chromatic aberration. For a surface 42 that is inclined closer to being perpendicular to the optical axis, the chromatic aberration may be finite, and may have a particular sign, greater than or less than zero. For a surface 42 that is inclined farther away from being perpendicular to the optical axis, the chromatic aberration may have the opposite sign. In this manner, the sign and amount of chromatic aberration may be explicitly controllable by adjusting the shape of the peripheral region 42 of the incident surface of the refractive/TIR lens 4.

Because the chromatic aberration may be controllable, as a second choice, the chromatic aberration of the "TIR" portion may be used to cancel that of the "refractive" portion. Specifically, the "TIR" portion may be set to have an equal and opposite amount of chromatic aberration as the "refractive" portion, so that they sum to zero or to a suitable small amount.

Note that as the surface 42 is adjusted at the design phase, the discontinuous boundary between the central region 41 and the peripheral region 42 forms an angle that also changes. In some cases the angle is acute, in other cases the angle is right, and in still other cases the angle is obtuse.

Note that the refractive/TIR lens 4 is not a collimating lens. Light collected from the LED 3 emerges from the lens 4 as converging to a focus F, not collimated. For the geometry of the fog lamp 1, a converging beam is needed to fit through the aperture 55 in the light baffle 5. As a result, if the lens 4 were to produce a collimated output beam, an additional lens would be required to focus the collimated light through the aperture 55 in the light baffle 5. For example, if the fog lamp in U.S. Pat. No. 8,011,803 (Cheung et al.) were to be modified to include a light baffle, it would require an additional lens to focus the collimated light through the baffle. Such an additional lens is not required for the present device, which is a potential advantage of the present device over that disclosed by Cheung. In the present embodiment, the anamorphic lens 6 is generally perpendicular to the optical axis.

The full fog lamp 1 may include multiple pairs of LEDs 3 and respective refractive/TIR lenses 4, all arranged coplanar, parallel and laterally adjacent to each other. The pairs of LEDs 3 and refractive/TIR lenses 4 may all direct light through a single light baffle 5 and through a single anamorphic lens 6.

More specifically, the LED 3 is one of a plurality of LEDs 3 that are spaced apart laterally. The plurality of LEDs 3 have respective optical axes 8 that are all generally parallel to the forward direction and parallel to each other. Similarly, the refractive/TIR lens 4 is one of a plurality of refractive/TIR lenses 4 that are spaced apart laterally. Each refractive/TIR lens 4 in the plurality receives light directly from a respective LED 3 in the plurality and produces respective converging light. The pairs of LEDs 3 and respective refractive/TIR lens 4 are aligned to each other so that the respective foci all lie at approximately the same longitudinal location in the fog lamp 1.

Each refractive/TIR lens 4 in the plurality may be formed from a suitable plastic or glass material, which may be injection-molded, extruded, or ground and polished in a known manner.

The fog lamp 1 includes a light baffle 5, which is placed proximate the foci, meaning that the light baffle 5 is at or near each focus F of a respective refractive/TIR lens 4 in the plurality. In the specific design of FIGS. 1-6, the light baffle 5 is placed before the foci, meaning that the foci are disposed between the refractive/TIR lenses 4 and the light baffle 5. In other cases, the light baffle 5 is placed after the foci, meaning that the foci are disposed between the light baffle 5 and anamorphic lens 6.

The light baffle 5 is intended to block unwanted stray light from exiting the fog lamp 1. In some cases, the light baffle 5 reduces the angular extent of the beam emergent from the fog lamp 1.

The light baffle 5 has an aperture 55 elongated in the lateral direction. In some cases, the aperture 55 may be referred to as a slit. The aperture 55 includes two parallel, lateral edges 53, 54 disposed on opposite sides of the optical axis. In some cases, the lateral edges 53, 54 are formed by two blades, one above and one below the optical axis of the fog lamp 1. In other cases, each pair of LED 3 and the refractive/TIR lens 4 has its own light baffle 5.

In the specific design of FIGS. 1-6, the blades have rounded edges on one side 52. In some cases, the rounded edge is on the side 52 facing the foci of the refractive/TIR lenses 4. In other cases, the rounded edge may be on the opposite side 51, facing away from the foci of the refractive/TIR lenses 4. Rounding an edge or edges with a finite radius may be beneficial, in that in that it may help prevent unwanted light bounces.

In some cases, the aperture 55 in the light baffle 5 may be 1 mm tall, in the vertical direction. Other values may be used as well, since the design may be adjusted as needed to accommodate various focal distances, vertical heights and widths.

The light baffle 5 may be formed from plastic, metal or any other suitable opaque material.

After passing through the slit in the light baffle 5, the beam strikes an anamorphic lens 6. The anamorphic lens 6 reduces the angular spread of the beam in the vertical direction and increases the angular spread of the beam in the lateral direction.

In the specific design of FIGS. 1-6, the anamorphic lens 6 is formed as a laterally-oriented plano-cylindrical lens with vertical flutes 63 on the planar side.

The incident surface 61 of the lens 6, facing the light baffle 5, includes vertical flutes 63 on a flat base curvature. In some cases, the flutes 63 are arranged as a series of parallel, vertically oriented semi-cylinders, with the curved side of the semi-cylinders facing the light baffle 5 and the flat side of the semi-cylinders facing the interior of the lens 6. In other cases, the orientation of the flutes 63 may be reversed, with the flat side facing outward and the curved side facing inward. In some cases, the flutes 63 are half-cylinders; in other cases, the flutes 63 may include more or less than half of the cylindrical shape. In still other cases, the flutes 63 may have a more wavy shape than true cylinders, or may have any suitable repeating pattern. Note that the flutes 63 are perpendicular to the optical axis of the fog lamp 1, and are not oriented at an acute angle with respect to an optical axis of the fog lamp 1 or the respective optical axis of any of the optical elements described herein.

Figure 9:
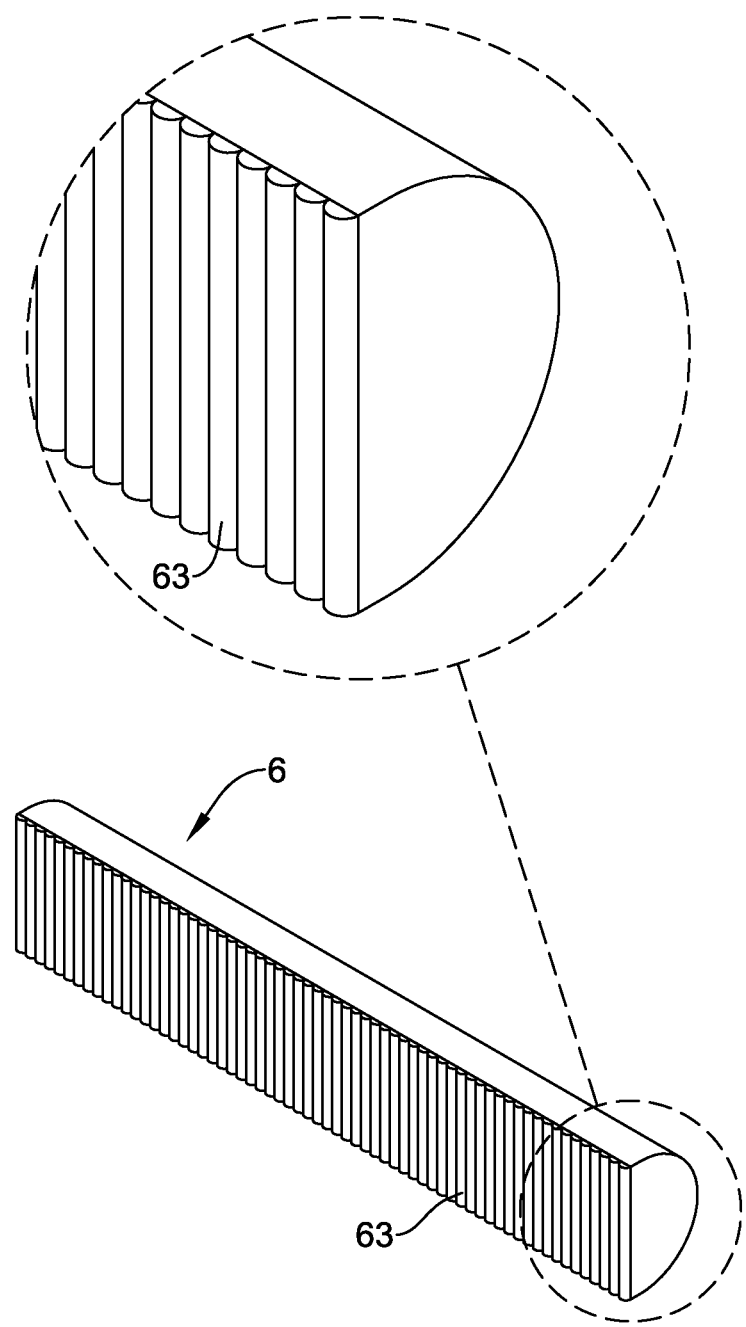
FIG. 9 is a close-up drawing of the vertical flutes on the incident surface of the anamorphic lens.

FIG. 9 is a close-up drawing of the vertical flutes 63 on the incident surface 61 of the anamorphic lens 6.

When used on the incident surface 61 of the lens 6, the flutes 63 serve to increase the angular spread of transmitted light 91, 92, 93 in the lateral direction, without substantially affecting the angular spread in the vertical direction. Additionally, the flutes 63 may also improve homogeneity in the transmitted beam, so that the transmitted light appears more uniform along a horizontal direction, which is desirable.

Figure 7:
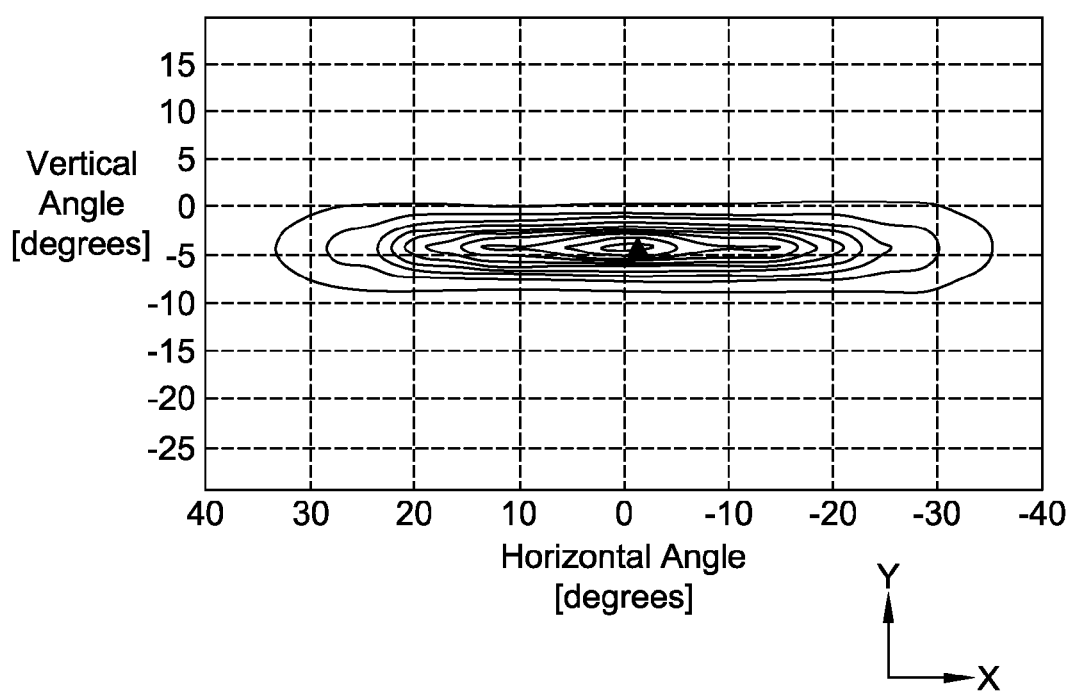
FIG. 7 is a contour plot of radiant intensity versus angle in the horizontal and vertical directions.

The exiting surface 62 of the lens 6, facing away from the light baffle 5, is generally cylindrical in shape, being curved in the vertical direction and being flat in the lateral direction. Such a shape has a strong amount of optical power along the vertical direction and essentially no optical power along the lateral direction. The curvature is chosen so that the front focal point of the anamorphic lens 6 falls at or close to the focus F formed by the refractive/TIR lens 4. Light from the focus F passing through the anamorphic lens 6 becomes collimated or nearly collimated in the vertical direction, so that the emergent beam has an angular spread of zero or only a few degrees in the vertical direction, as shown in FIG. 7 and discussed below. Along the vertical direction, the beam exiting the anamorphic lens 6 is narrower than the beam entering the anamorphic lens 6. In some cases, the cylindrical shape may be aspheric, where the surface prescription may include a non-zero conic constant and/or aspheric polynomial terms. In some cases, the exiting surface 62 is generally cylindrical with a convex curvature along the vertical direction and no net curvature along the lateral direction. In other cases, the exiting surface 62 has a continuously changing smooth shape along both vertical and lateral directions.

In some cases, the anamorphic lens 6 is fabricated in two parts, which are made separately and are then attached to each other. In some cases, the two parts are the cylindrical lens, which may be extruded, and the vertical flutes 63, which may be attached to the flat side of the lens 6.

Finally, there may be a housing 7 that surrounds the other optical elements. For instance, the housing 7 may be made as a molded plastic element. The housing 7 may be made in the shape of a rectangular box having two opposite open sides, where the open sides are facing the viewer and facing opposite the viewer. Other suitable designs and known manufacturing methods may also be used.

Thus far, FIGS. 1-6 have been concerned with the structure and elements of the fog lamp 1. FIG. 7 shows a sample simulated output performance for the fog lamp 1 of FIGS. 1-6. Specifically, FIG. 7 is a contour plot of radiant intensity, in flux per steradian, versus angle in the horizontal and vertical directions, for an optimized example design.

In FIG. 7, the "hot spot," or location of peak flux per steradian, is at about −4 degrees vertical, which is pointing down slightly, and about +2 degrees horizontal, which is pointing slightly toward the shoulder of the road in front of the vehicle. Note that the axis labeled horizontal is actually the lateral direction, as described above. The FWHM (full-width-at-half-maximum value) is about 35 degrees horizontally by about 4 degrees vertically. For this example, the value of 4 degrees is a relatively small angular spread of zero or only a few degrees. Essentially all the light propagates below 0 degrees vertically, so there is essentially no light propagating upward, or above the horizon, from the fog lamp 1.

For the specific design that produced the simulated results of FIG. 7, the material of both lenses was chosen to be PMMA (polymethyl methacrylate). These particular simulations were performed at a red wavelength of 633 nm. PMMA has a refractive index of 1.489 at a wavelength of 633 nm. Note that the full visible spectrum extends from 400 nm to 700 nm, and that one of ordinary skill in the art may choose to do simulation and/or optimization at any suitable wavelength, multiple wavelengths or range of wavelengths within this spectrum. In some cases, the simulation may include all or part of the emission spectrum from the LEDs 3.

Simulations were performed with LucidShape, which is computer aided designing software for lighting design tasks. LucidShape is commercially available from Brandenburgh GmbH in Paderborn, Germany. It is understood that any suitable ray-tracing software may also be used for the simulation of performance, and the adjustment of various system parameters to optimize performance.

Figure 8A:
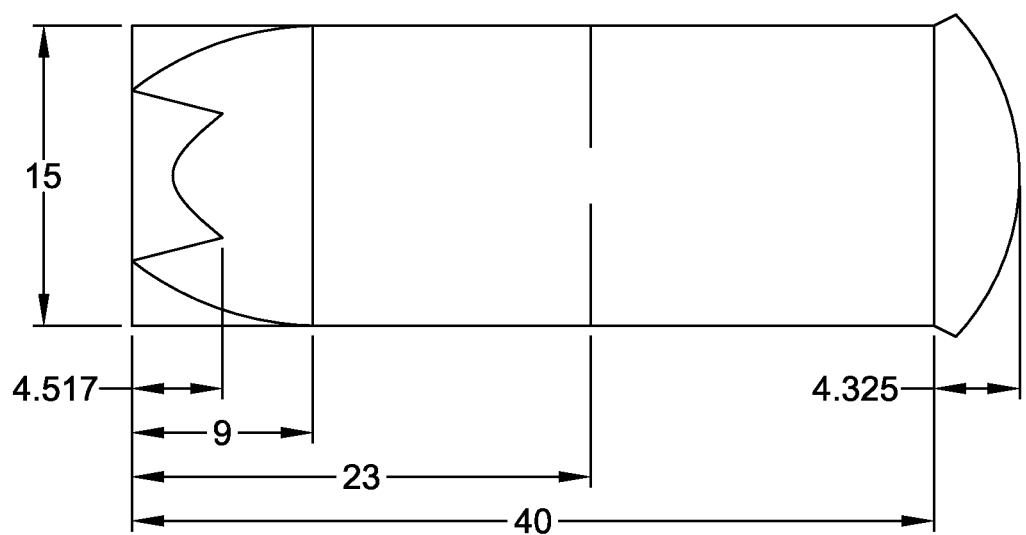
FIGS. 8A and 8B are dimensioned drawings of an exemplary fog lamp.
Figure 8B:
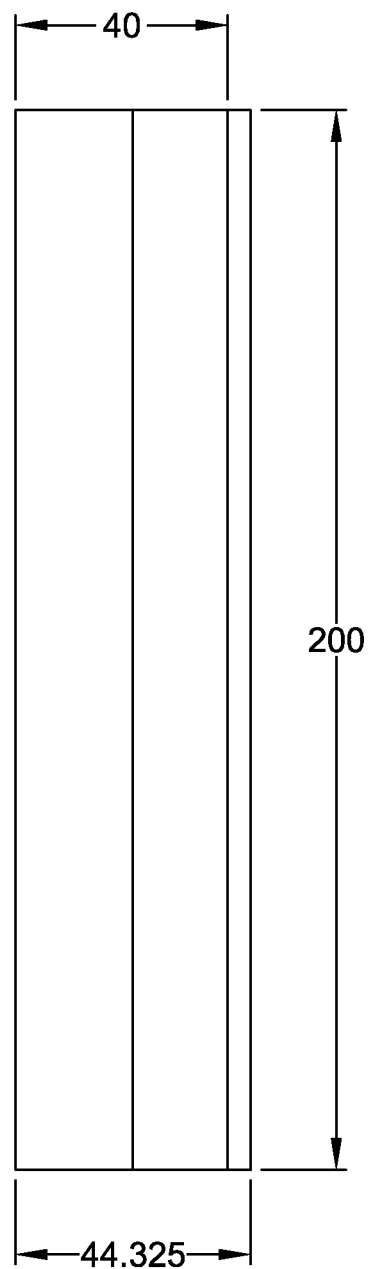

Finally, FIGS. 8A and 8B are dimensioned drawings of an exemplary fog lamp, viewed from the side and from the top, respectively. The dimensions are in mm. This is only an example, and is not intended to be limiting in any way.

The description of the invention and its applications as set forth herein is illustrative and is not intended to limit the scope of the invention. Variations and modifications of the embodiments disclosed herein are possible, and practical alternatives to and equivalents of the various elements of the embodiments would be understood to those of ordinary skill in the art upon study of this patent document. These and other variations and modifications of the embodiments disclosed herein may be made without departing from the scope and spirit of the invention.

GLOSSARY

A Non-Limiting Summary of Above Reference Numerals 1 fog lamp
2 circuit board
3 light emitting diode (LED)
4 refractive/TIR lens
5 light baffle
6 anamorphic lens
7 housing
8 optical axis
41 central region of incident surface of refractive/TIR lens
42 peripheral region of incident surface of refractive/TIR lens
43 outer surface of refractive/TIR lens
44 exiting surface of refractive/TIR lens
51 front surface of light baffle
52 back surface of light baffle
53 upper lateral edge
54 lower lateral edge
55 aperture in light baffle
61 incident surface of anamorphic lens
62 exiting surface of anamorphic lens
63 vertical flutes
71 light ray that strikes the peripheral region of incident surface of refractive/TIR lens
72 light ray that strikes the peripheral region of incident surface of refractive/TIR lens
81 light ray that strikes the central region of incident surface of refractive/TIR lens
82 light ray that strikes the central region of incident surface of refractive/TIR lens
91 light ray striking the vertical flutes on the incident side of the anamorphic lens
92 light ray striking the vertical flutes on the incident side of the anamorphic lens
93 light ray striking the vertical flutes on the incident side of the anamorphic lens
F focus of light from refractive/TIR lens
X lateral direction
Y vertical direction
Z forward direction

What is claimed is:

1. A fog lamp (1) emitting light in a generally forward direction (Z), comprising:
a light emitting diode (LED) (3) having an optical axis (8) generally parallel to the forward direction (Z);
a refractive/TIR lens (4) receiving light directly from the LED (3) and producing converging light, the converging light converging to a focus (F) along the optical axis (8);
a light baffle (5) disposed proximate the focus (F), the light baffle (5) having an aperture (55) centered on the optical axis (8) and elongated along a lateral direction (X), wherein the converging light that passes through the aperture (55) forms diverging light; and
an anamorphic lens (6) having more optical power along a vertical direction (Y) than along the lateral direction (X), wherein the diverging light that passes through the anamorphic lens (6) forms an emergent beam, wherein the emergent beam has a wider divergence along the lateral direction (X) than along the vertical direction (Y).

2. The fog lamp (1) of claim 1,
wherein the refractive/TIR lens (4) has an incident surface (41, 42); and
wherein the incident surface (41, 42) has a central region (41) surrounding the optical axis and a peripheral region (42) surrounding the central region (41).

3. The fog lamp (1) of claim 2, wherein the converging light is formed from both light striking the central region (41) and undergoing only refractions and light striking the peripheral region (42) and undergoing refractions plus an internal reflection on an outer surface (43) of the refractive/TIR lens (4).

4. The fog lamp (1) of claim 2,
wherein the peripheral region (42) of the incident surface (41, 42) of the refractive/TIR lens (4) is a refractive surface facing the LED (3) that receives light directly from the LED (3), and
wherein light striking the refractive surface refracts through the refractive surface and propagates directly to the outer surface (43) of the refractive/TIR lens (4).

5. The fog lamp (1) of claim 2, wherein the central region (41) and the peripheral region (42) of the incident surface (41, 42) of the refractive/TIR lens (4) meet at a discontinuous boundary and form an acute angle in air at said discontinuous boundary.

6. The fog lamp (1) of claim 1, wherein an emission plane of the LED (3), the light baffle (5), and an incident surface (61) of the anamorphic lens (6) are all generally planar and are all perpendicular to the forward direction (Z).

7. The fog lamp (1) of claim 1,
wherein the focus (F) and the light baffle (5) are disposed longitudinally between the refractive/TIR lens (4) and the anamorphic lens (6); and
wherein the refractive/TIR lens (4) is disposed longitudinally between the LED (3) and the light baffle (5).

8. The fog lamp (1) of claim 1, wherein the focus (F) is disposed longitudinally between the light baffle (5) and the anamorphic lens (6).

9. The fog lamp (1) of claim 1, wherein the anamorphic lens (6) is generally plano-cylindrical, having a generally planar side (61) facing the light baffle (5) and having a generally cylindrical side (62) facing away from the light baffle (5).

10. The fog lamp (1) of claim 9, wherein the generally planar side (61) includes a plurality of vertically-oriented flutes (63) that improve the homogeneity of the emergent beam along the lateral direction (X).

11. The fog lamp (1) of claim 9, wherein the generally cylindrical side (62) has a convex curvature along the vertical direction (Y) and no net curvature along the lateral direction (X).

12. The fog lamp (I) of claim 1, wherein the light baffle (5) includes two parallel, lateral edges (53, 54) disposed on opposite sides of the optical axis (8).

13. The fog lamp (1) of claim 12,
wherein the light baffle (5) includes front and back surfaces (51, 52); and
wherein at least one of the front surface (51) and the back surface (52) includes a rounded edge adjacent to a respective, said lateral edge.

14. The fog lamp (1) of claim 1,
wherein the LED (3) is one of a plurality of LEDs (3) that are spaced apart laterally (X), the plurality of LEDs (3) having respective optical axes (8) that are all generally parallel to the forward direction (Z) and parallel to each other;
wherein the refractive/TIR lens (4) is one of a plurality of refractive/TIR lenses (4) that are spaced apart laterally (X), each refractive/TIR lens (4) in the plurality receiving light directly from a respective LED (3) in the plurality and producing respective converging light;
wherein the aperture (55) in the light baffle (5) receives the converging light from each of the refractive/TIR lenses (4) in the plurality and forms respective diverging light;
wherein the anamorphic lens (6) receives the respective diverging light for each of the refractive/TIR lenses (4) in the plurality and produces the emergent beam.

15. The fog lamp (1) of claim 14,
wherein the aperture (55) in the light baffle (5) is a single aperture; and
wherein the anamorphic lens (6) is a single lens.

16. The fog lamp (1) of claim 1,
wherein the light baffle (5) occludes light that is not passed through the aperture (55) from reaching the anamorphic lens (6).

\* \* \* \* \*